(12) United States Patent  (10) Patent No.: US 8,661,248 B2
Chen  (45) Date of Patent: Feb. 25, 2014

(54) METHOD, APPARATUS, AND SYSTEM FOR SENDING AND RECEIVING SECURITY POLICY OF MULTICAST SESSIONS

(75) Inventor: Xu Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 422 days.

(21) Appl. No.: 12/609,128

(22) Filed: Oct. 30, 2009

(65) Prior Publication Data
US 2010/0049973 A1   Feb. 25, 2010

Related U.S. Application Data

(63) Continuation of application No. PCT/CN2008/071915, filed on Aug. 7, 2008.

(30) Foreign Application Priority Data

Aug. 16, 2007  (CN) .......................... 2007 1 0138750

(51) Int. Cl.
   *H04L 29/06*   (2006.01)
   *G06F 1/00*    (2006.01)
   *H04L 9/00*    (2006.01)
   *H04L 9/08*    (2006.01)

(52) U.S. Cl.
   USPC ............ 713/163; 713/150; 380/277; 380/281

(58) Field of Classification Search
   USPC .......................................... 713/201, 150, 163
   See application file for complete search history.

(56) References Cited

U.S. PATENT DOCUMENTS

| 5,594,782 | A | 1/1997 | Zicker et al. |
| 2005/0055579 | A1* | 3/2005 | Kanda et al. ................. 713/201 |
| 2009/0271612 | A1 | 10/2009 | Liu |

FOREIGN PATENT DOCUMENTS

| CN | 1671096 A | 9/2005 |
| CN | 1301469 | 2/2007 |
| CN | 100411480 | 8/2008 |
| WO | WO 02/080454 A2 | 10/2002 |
| WO | WO 2006/034310 A1 | 3/2006 |
| WO | WO 2007/030074 A1 | 3/2007 |

OTHER PUBLICATIONS

D. McGrew, Datagram Transport Layer Security (DTLS) Extension to Establish Keys for Secure Real-time Transport Protocol (SRTP) draft-ietf-avt-dtls-srtp-00.txt, Mar. 10, 2007, Network Working Group, p. 1-24.*

International Search Report from P.R. China in International Application No. PCT/CN2008/071915 mailed Nov. 13, 2008.

McGrew, et al., "Datagram Transport Layer security (DTLS) Extension to Establish Keys for Secure Real-time Transport Protocol (SRTP), draft-ieft-avt-dtls-srtp-00.txt", Networking Group, Internet-Draft pages 1-24, (Mar. 10, 2007).

(Continued)

*Primary Examiner* — Evans Desrosiers
(74) *Attorney, Agent, or Firm* — Brinks, Gilson & Lione

(57) ABSTRACT

A method, apparatus, and system for sending and receiving a security policy of multicast sessions are provided. The method for sending the security policy of multicast sessions includes: after a Datagram Transport Layer Security (DTLS) session is set up between a sender and a receiver, receiving a security policy request from the receiver, constructing a security policy response according to a security policy, multiplexing the security policy response and Secure Real-Time Transport Protocol (SRTP) multicast session data, and sending the multiplexed data to the receiver.

18 Claims, 5 Drawing Sheets

(56) References Cited

OTHER PUBLICATIONS

Wing, "DTLS-SRTP Key Transport, draft-wing-avt-dtls-srtp-key-transport-02", AVT Working Group, Internet-Draft, pp. 1-26, (Jul. 14, 2008).
Schulzrinne et al, "RTP: A Transport Protocol for Real-Time Applications," rfc1889.txt, Jan. 1996.
Hardjono, et al., "The Multicast Group Security Architecture," rfc3740.txt ,Mar. 2004.
Rescorla, et al. "Datagram Transport Layer Security," rfc4347. txt,Apr. 2006.
Arkko, et al., "Key Management Extensions for Session Description Protocol (SDP) and Real Time Streaming Protocol (RTSP)" rfc4567. pdf, Jul. 2006.
Andreasen, et al. "Session Description Protocol (SDP) Security Descriptions for Media Streams," rfc4568.pdf Jul. 2006.
McGrew et al., "Datagram Transport Layer Security (DTLS) Extension to Establish Keys for Secure Real-time Transport Protocol (SRTP)" draft-ietf-avt-dtls-srtp-00.txt Mar. 2007.
Extended European Search Report dated (mailed) Apr. 7, 2010, issued in related Application No. 08783908.0-2413 / 2136504 PCT/CN2008071915, filed Oct. 7, 2008, Huawei Technologies Co., Ltd.
First Chinese Office Action dated (mailed) Oct. 26, 2011, issued in related Chinese Application No. 200710138750.5 Huawei Technologies Co., LTD.
Written Opinion of the International Searching Authority (translation) dated (mailed) Nov. 13, 2008, issued in related Application No. PCT/CN2008/071915, filed Aug. 7, 2008, Huawei Technologies Co., Ltd.
Office Action issued in corresponding Chinese Patent Application No. 200710138750.5, mailed Aug. 3, 2012.
McGrew et al., "Datagram Transport Layer Security (DTLS) Extension to Establish Keys for Secure Real-time Transport Protocol (SRTP)" Network Working Group, Mar. 10, 2007.
Office Action issued in corresponding Chinese Patent Application No. 200710138750.5, mailed Jan. 14, 2013.
English Translation of the PCT Written Opinion of the International Searching Authority for PCT/CN2006/001450, mailed Nov. 2, 2006, 3 pgs.
WiMAX Forum Network Working Group, "Network Discovery and Selection", Apr. 14, 2005, 17 pgs.

* cited by examiner

METHOD, APPARATUS, AND SYSTEM FOR SENDING AND RECEIVING SECURITY POLICY OF MULTICAST SESSIONS

CROSS-REFERENCE TO RELATED APPLICATIONS

This application is a continuation of International Application No. PCT/CN2008/071915, filed on Aug. 7, 2008, which claims the benefit of priority to Chinese Application No. 200710138750.5, filed on Aug. 16, 2007, both of which are hereby incorporated by reference in their entireties.

FIELD OF THE TECHNOLOGY

The present disclosure relates to computer and communication technologies, and in particular, to a method, apparatus, and system for sending and receiving the security policy of multicast sessions.

TECHNICAL BACKGROUND

As a network transport protocol, the Real-Time Transport Protocol (RTP) was published by the Audio-Video Transport Working Group of the Internet Engineering Task Force (IETF) in 1996. RTP specifies standard formats for audio and video data packets on the Internet and lays a technical foundation for the Internet Protocol (IP) telephony industry. As a profile of RTP, Secure RTP (SRTP) provides privacy and integrity for RTP. SRTP does not support the function of algorithm negotiation and key exchange. In general, the function is implemented by signaling protocols or other key management protocols. According to latest research achievements, in-band key negotiation based on Datagram Transport Layer Security (DTLS) in point-to-point RTP sessions is widely recognized.

In the key negotiation solution in the prior art, the negotiation function is performed over a signaling channel; that is, the security policy of SRTP is carried by a signaling channel. The sender of an SRTP multicast session (hereinafter referred to as the sender) uses the Session Announcement Protocol (SAP) or the Session Initiation Protocol (SIP) to invite each receiver of the SRTP multicast session (hereinafter referred to as the receiver) to set up an SRTP session. The signaling protocol carries the descriptor of the Session Description Protocol (SDP) to describe the security policy of SRTP.

The prior art, however, exhibits the following weaknesses:

First, the early arrival of content exists, which also exists in the point-to-point signaling solution. The main cause for the early arrival of content is that the key stream is asynchronous with the real-time data stream. In actual applications, the real-time data stream and key stream are transmitted through different paths and the transmission delay cannot be accurately determined because different quality of service (QoS) polices are used. Thus, the encrypted data may arrive earlier than the confirmation data for security policy updating. The key is not loaded to the SRTP stack. Thus, the encrypted data stream that arrives earlier cannot be normally decrypted. This causes data interruption and potential security holes and affects the quality of the user experience.

Second, the solution is related to the specified implementation solution. For an SRTP multicast session, for example, in a multicast conference, the receivers join the multicast group through the Internet Group Management Protocol (IGMP) to receive the multicast data. In this case, the multicast system does not require out-of-band signaling negotiation and the key negotiation based on out-of-band signaling is limited to the specified implementation mode.

Finally, in this solution, the trusted terminal may be indefinite in a complex multi-terminal system. In actual applications, the called terminal (a receiver) may be connected to one or more other terminals (other receivers) through a SIP proxy server. The connected terminal may not have the right to join the RTP multicast session but may listen to the encrypted SRTP multicast session through the key carried by SIP.

Thus, the key negotiation solution in the prior art cannot realize safe negotiation about the security policy of SRTP multicast sessions. For example, the content may arrive earlier; the solution is limited to the specific setup modes of RTP multicast sessions; and the trusted terminal is indefinite.

SUMMARY

Embodiments of the present disclosure provide a method, apparatus, and system for sending and receiving the security policy of multicast sessions to improve the key negotiation in the prior art which cannot realize safe negotiation about the security policy of SRTP multicast sessions.

A method for sending the security policy of multicast sessions includes: after a DTLS session is set up between a sender and a receiver, receiving a security policy request sent from the receiver, constructing a security policy response according to the security policy, multiplexing the security policy response and the SRTP multicast session data, and sending the multiplexed data to the receiver.

A method for receiving the security policy of multicast sessions includes: generating a security policy request after setting up a DTLS session; multiplexing the security policy request and SRTP multicast session data and sending the multiplexed data to a sender; and receiving a security policy response sent from the sender.

A multicast sending apparatus includes: a first key pulling unit, configured to: set up a DTLS session, receive a security policy request, and construct a security policy response according to a policy security; a first transmitting unit, configured to construct SRTP multicast session data; and a first multiplexing/de-multiplexing unit, configured to multiplex the security policy response and the SRTP multicast session data.

A multicast receiving apparatus includes: a second key pulling unit, configured to set up a DTLS session and generate a security policy request; a second transmitting unit, configured to construct SRTP multicast session data; and a second multiplexing/de-multiplexing unit, configured to multiplex the security policy request and the SRTP multicast session data and send the multiplexed data.

A network system includes a multicast sending apparatus and a multicast receiving apparatus.

The multicast receiving apparatus is configured to: set up a DTLS session with the multicast sending apparatus, generate a security policy request, multiplex the security policy request and the SRTP multicast session data, and send the multiplexed data to the multicast sending apparatus.

The multicast sending apparatus is configured to: set up a DTLS session with the multicast receiving apparatus, receive the security policy request sent from the multicast receiving apparatus, construct a security policy response according to the security policy, multiplex the security policy response and the SRTP multicast session data, and send the multiplexed data to the multicast receiving apparatus.

Some embodiments of the present disclosure solve the issue that the key negotiation solution in the prior art cannot realize safe negotiation about the security policy of SRTP multicast sessions. Specifically, the in-band security policy negotiation avoids the early arrival of content; transmitting the security policy to the receivers directly avoids indefinite trusted terminals; the implementation mode of the present disclosure is independent of the setup mode of RTP multicast sessions because standard DTLS and RTP are used; and the in-band transmission of the security policy realizes firewall traversal.

DETAILED DESCRIPTION OF THE EMBODIMENTS

The following describes principles, implementation modes, and benefits of the embodiments of the present disclosure with reference to the accompanying drawings. Embodiments of the present disclosure are based on two basic devices: sender and receiver. A multicast system may include multiple receivers. In the embodiments of the present disclosure, it is supposed that the multicast system includes only one receiver. An RTP multicast session is set up between the sender and the receiver. The RTP multicast session uses SRTP as the security transport layer to ensure the privacy and integrity. SRTP does not provide the key negotiation function. In the embodiments of the present disclosure, an in-band mode is provided to send the security policy required for the RTP multicast session to the receiver. In addition, the embodiments of the present disclosure provide a security update mechanism to enhance the forward and backward security of the security policy.

In particular, a security policy includes a content key (CK), a key encryption key (KEK), and SRTP session information. The CK is used to provide a primary key for the SRTP stack, and the SRTP stack may generate a traffic key according to the CK and SRTP session information. A traffic key policy usually includes an encryption key and an integrity key. The KEK protects the privacy and integrity of the security policy updating data. The KEK is optional in the security policy and may be omitted when the security policy does not need to be updated. The RTP session information includes a sequence number and the count of sequence number cycles. The RTP session information and the CK are used to generate a traffic key for SRTP and to further provide integrity and privacy protection for RTP sessions.

Figure 1:
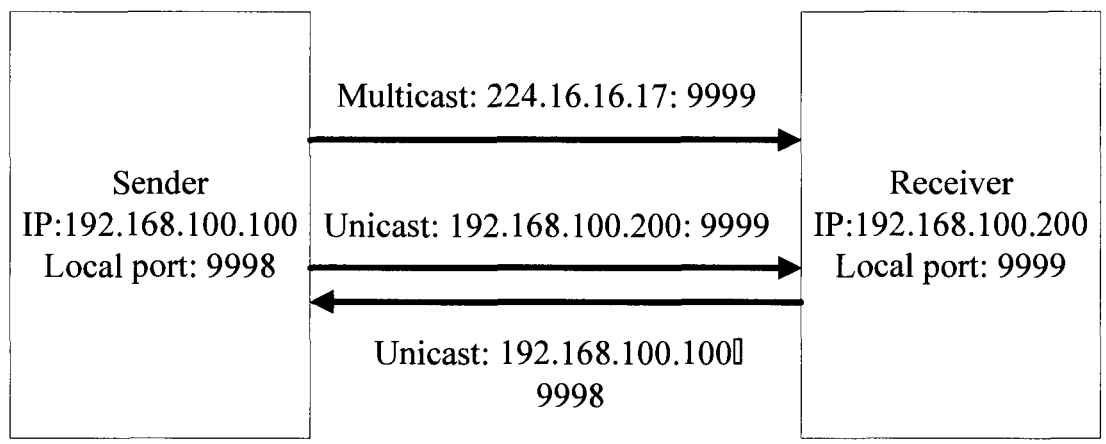
FIG. 1 shows a structure of an SRTP multicast session system according to an embodiment of the present disclosure.

In an implementation process, the embodiments of the present disclosure use an RTP data channel (determined by the pair of source and destination ports) to transmit unicast and multicast data. FIG. 1 shows a structure of an SRTP multicast session system in an embodiment of the present disclosure. The system includes a sender and a receiver. For the sender, the IP address is 192.168.100.100 and the local port number is 9998. For the receiver, the IP address is 192.168.100.200 and the local port number is 9999. The multicast address of the sender is 224.16.16.17 and the destination port number is 9999. A one-way multicast channel and a two-way unicast channel exist on port 9998 and port 9999 at the same time.

Figure 2:
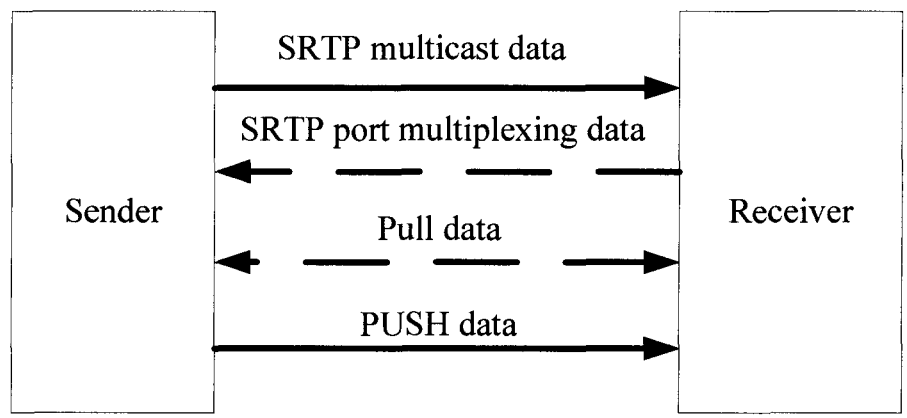
FIG. 2 shows a structure of a multicast data channel according to an embodiment of the present disclosure.

In actual applications, the multicast channel is used to deliver SRTP multicast session data and the push data for updating the security policy and the two-way unicast channel is used to transmit RTP session multiplexing data such as RTCP data or inverse point-to-point RTP session data and the pull data for multicast policy negotiation. FIG. 2 shows a structure of a multicast channel in an embodiment of the present disclosure. A solid line indicates a multicast channel and a broken line indicates a unicast channel.

Figure 3:
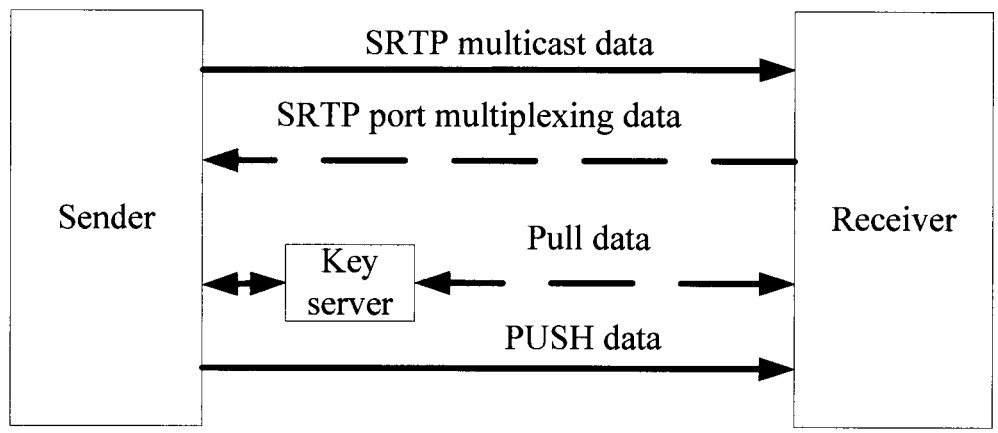
FIG. 3 shows a channel structure when a key server is separated according to an embodiment of the disclosure.

In large-scale networking scenarios, the group key management is separated from the multicast key management server. In this case, two solutions are provided: out-of-band user registration and in-band parameter push, and use of an independent multiplexing/de-multiplexing unit. FIG. 3 shows a channel structure when the key server is separated in an embodiment of the present disclosure. A solid line indicates a multicast channel and a broken line indicates a unicast channel. The receiver sends a registration request to the key server. A private protocol is used to set up a point-to-point data channel between the receiver and the key server to pull the security policy stored in the key server to the receiver. The receiver stores the security policy to decrypt the multicast data sent from the sender. The sender uses the private protocol to exchange data with the key server to obtain the security policy updating data and pushes the obtained data to the receiver through a multicast channel in in-band mode.

In the independent multiplexing/de-multiplexing solution, an independent device is used for multiplexing/de-multiplexing. The de-multiplexed data is directly sent to the receiver for key management and to the sender for RTP transmission. Thus, the in-band negotiation of the security policy is complete.

In particular, the solution of out-of-band user registration and in-band parameter push and the independent multiplexing/de-multiplexing solution both support the load sharing among multiple key servers.

Figure 4:
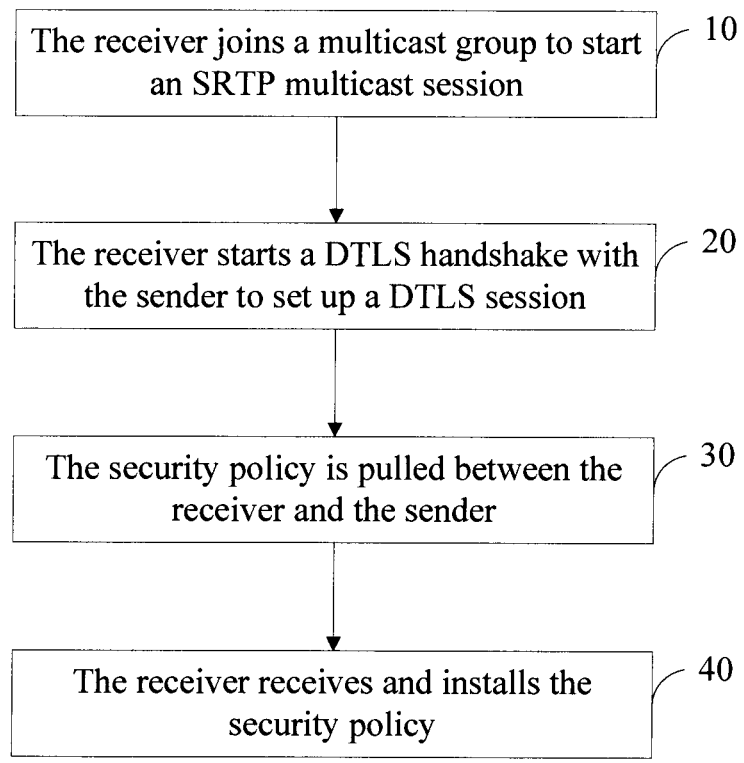
FIG. 4 is a flowchart of a method for sending a security policy of a multicast session according to an embodiment of the present disclosure.

As shown in FIG. 4, the method for sending the security policy of multicast sessions in an embodiment of the present disclosure includes the following steps:

Step 10: The receiver joins a multicast group and starts an SRTP multicast session.

In this step, the receiver needs to know the port and address information of the RTP multicast session in advance. In general, the manager of the RTP multicast session notifies the port and address information of the RTP multicast session to the receiver in out-of-band mode. For example, the Web portal or signaling protocol is used to notify or invite the receiver to join the multicast group.

Step 20: The receiver starts a DTLS handshake with the sender to set up a DTLS session.

In this step, the standard DTLS protocol is used. In the implementation mode, however, the data exchanged between the receiver and sender and the RTP data are multiplexed before being transmitted.

In fact, the setup of a DTLS session between the receiver and the sender is to use the DTLS record layer in the prior art to provide privacy and integrity protection for the pull data to be transmitted between the receiver and the sender. In the prior art, the standard DTLS record layer only provides security protection for upper layer data and is not further described.

Step 30: The security policy is pulled between the receiver and the sender. Specifically, the receiver requests the security policy from the sender; and the sender multiplexes the security policy and the SRTP data, and then sends the multiplexed data to the receiver.

It should be noted that multiplexing is a common technical term in the embodiments of the present disclosure. Multiplexing is to bind different network protocol data or other data to the same open port for sending or reception. Different network protocol data or other data may be identified by the flag bit in the header of the data packet so that the multiplexed data can be de-multiplexed.

The pull process means that the receiver requests the security policy from the sender. The receiver initiates the pull process and requests the security policy from the sender. The security policy request is protected by the DTLS record layer when being transmitted. In this way, the security policy request can be transmitted securely. After receiving the security policy request from the receiver, the sender locally extracts the stored security policy, constructs a security policy response, and sends the security policy response to the receiver under the protection of the DTLS record layer. After receiving the security policy response, the receiver decrypts it and stores the security policy.

The security policy includes a CK, a KEK, and RTP session information. The CK is used to provide a primary key for an RTP session, and the receiver may generate a traffic key according to the CK and SRTP session information. The traffic key usually includes an encryption key and an integrity key. The KEK provides privacy and integrity protection for the security policy updating data and is optional in the security policy. The SRTP session information includes a sequence number and the count of sequence number cycles. The SRTP session information and the CK are used to generate a traffic key and to further provide integrity and privacy protection for RTP sessions.

Step 40: The receiver receives and installs the security policy.

The process of installing the security policy includes: loading the CK and the corresponding RTP session information, generating a traffic key to decrypt the RTP multicast session data transmitted through SRTP, and outputting media data.

When discovering that the CK in the security policy expires or is no longer secure, the sender updates the security policy and delivers the new security policy updating data to the receiver. During the delivery, the KEK is used to ensure the security and integrity of the security policy updating data. This process is referred to as the push process. The push data packet includes the security policy updating data that is used to update the CK of the receiver. The push data packet may further include the KEK updating data that is used to update the KEK data of the receiver at the same time. The push process is initiated by the sender. The multicast channel is used to deliver push data to forcibly update the security policy of the receiver.

The foregoing security policy negotiation may be performed before or when the RTP multicast session data is sent. In the case that the security policy negotiation is performed when the RTP multicast session data is sent, the security policy negotiation data and the RTP multicast session data are multiplexed before being transmitted through the same channel. During channel multiplexing, the RTP multicast session data protected by SRTP, the security policy request and security policy response protected by the DTLS protocol, and the security policy updating data protected by the KEK are transmitted over the same channel after being multiplexed. After receiving the multiplexed data, the receiver de-multiplexes the data to obtain the corresponding RTP multicast session data, security policy response, and security policy updating data, and performs corresponding processing.

In the embodiments of the present disclosure, the receiver joins a multicast group to start an SRTP multicast session; the receiver and the sender start a DTLS handshake to set up a DTLS session; the receiver and the sender pull the security policy; and the receiver installs the security policy. When discovering that the security policy expires or is no longer secure, the sender may initiate the push process to update the security policy and deliver the updated security policy.

In the foregoing embodiment, the in-band mode is used to complete security policy negotiation, which solves the issue that the key negotiation solution in the prior art cannot realize safe negotiation about the security policy of SRTP multicast sessions. In addition, the implementation mode of the present disclosure is independent of the setup mode of RTP multicast sessions, which avoids the early arrival of content. The security policy is directly transmitted to the receiver. Thus, the trusted terminal is definite. Moreover, the in-band transmission of the security policy realizes firewall traversal.

Those skilled in the art may understand that all or part of the steps in the foregoing embodiments may be implemented by hardware instructed by a program. The program may be stored in a computer-readable storage medium.

The execution of the program includes the following steps:

1. After setting up a DTLS session with a sender, the receiver sends a security policy request to the sender and receives the security policy that the sender sends after multiplexing the SRTP data.

2. The receiver installs the received security policy.

The computer-readable medium may be a read-only memory/random access memory (ROM/RAM), a magnetic disk, or a compact disk.

Figure 5:
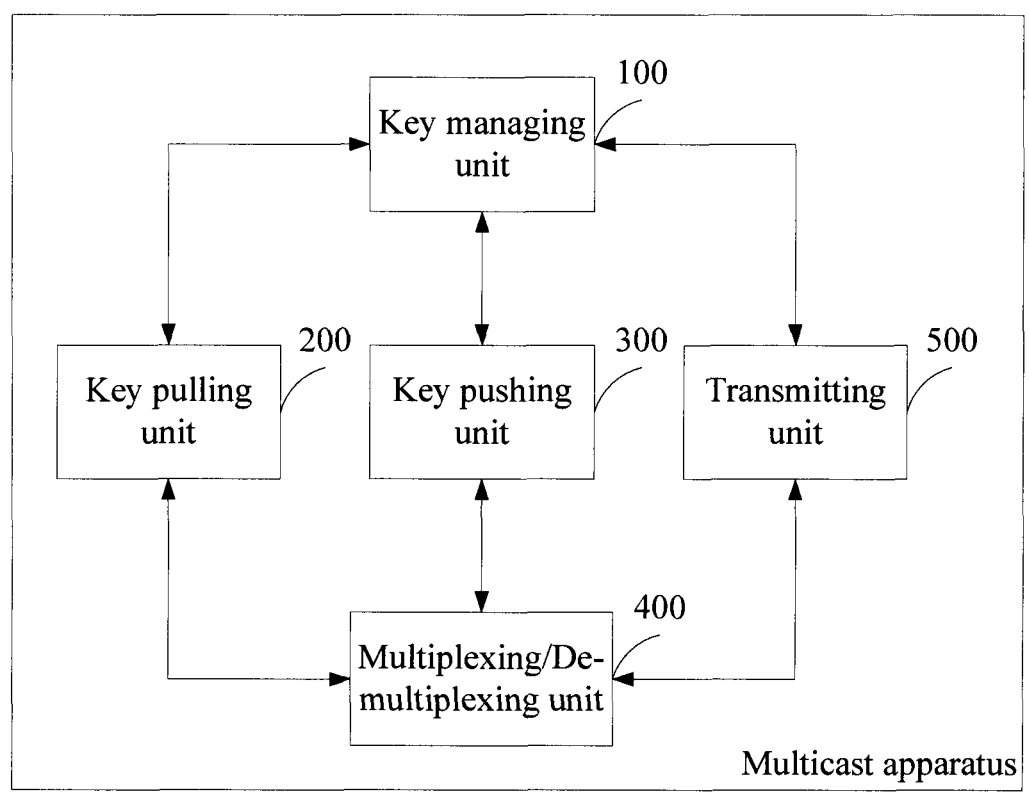
FIG. 5 shows a structure of an apparatus for sending/receiving the security policy of multicast sessions according to an embodiment of the present disclosure.

Accordingly, a multicast apparatus is also provided. As shown in FIG. 5, the multicast apparatus includes a key managing unit 100, a key pulling unit 200, a key pushing unit 300, a multiplexing/de-multiplexing unit 400, and a transmitting unit 500.

The key managing unit 100 is configured to store and manage security policies.

In particular, the key managing unit 100 (a second key managing unit) in the receiver and the key managing unit 100 (a first key managing unit) in the sender are both configured to store and manage security policies.

The security policy includes a CK, a KEK, and RTP session information. The CK is used to generate a primary key for an RTP session and thus a key policy is generated for the RTP session according to the CK. The KEK is used to provide privacy and integrity protection for security policy updating data. The RTP session information is used to match the RTP session to be encrypted and to generate relevant key policies for RTP sessions with the CK.

To minimize the storage space of the security policy and shorten the access delay caused by DTLS negotiation, the embodiments of the present disclosure use a mapping mechanism between the CK and the primary RTP session key. That is, multiple relevant RTP sessions adopt the same security policy. For example, different RTP sessions need to be set up for audio transmission over left and right channels. The two RTP sessions are of high correlation and thus can adopt the same security policy. That is, the same primary RTP session key is used for the two RTP sessions. RTP session multiplexing mainly includes three cases: RTCP and RTP port multiplexing, symmetric RTP session multiplexing, and multimedia RTP session multiplexing. In these three cases, the RTP sessions are different, but they are closely correlated and can adopt the same CK or primary RTP session key. Adopting the same security policy decreases the security of RTP sessions. Thus, the specific implementation policy is related to the policy of the multicast group and the mapping must abide by the principle that RTP sessions are of high correlation to prevent CK disclosure.

The key pulling unit 200 is configured to: run the standard DTLS protocol to set up a TDLS session, send a security policy request, receive a security policy response, and send the received security policy response to the key managing unit 100.

In the pull process of the security policy, the key pulling unit 200 (a second pulling unit) in the receiver initiates a security policy request; the key pulling unit 200 (a first key pulling unit) in the sender extracts the security policy from the key managing unit 100 (the first key managing unit) in the sender and sends the security policy response to the receiver; and the key pulling unit 200 (the second key pulling unit) in the receiver obtains the corresponding security policy from the received security policy response and installs the security policy in the key managing unit 100 (the second key managing unit) in the receiver.

In the entire pull process, the point-to-point interaction occurs between the sender and a single receiver. As the upper layer application of the DTLS protocol, the entire pull process is protected by the DTLS record layer. In the pull process, the security policy is provided by the key managing unit 100 (the first key managing unit) in the sender. The security policy includes a CK, a KEK, and RTP session information.

The key pushing unit 300 is configured to: update and send the security policy and the security policy updating data when the CK expires or is no longer secure, and receive security policy updating data and send it to the key managing unit 100 to update the security policy.

In particular, when the CK of the receiver expires or is no longer secure, the key pushing unit 300 (a first key pushing unit) in the sender updates the security policy, generates security policy updating data, and sends the security policy updating data to the receiver. To ensure the security and integrity of the new CK during transmission, a KEK parameter needs to be used to encrypt the CK in the push process. The push data packet may further include the KEK updating data that is used to update the KEK data of the receiver at the same time. The new CK data, KEK data, and corresponding cryptographic algorithm are all obtained from the key managing unit 100 (the first key managing unit) in the sender.

The key pushing unit 300 (the second key pushing unit) in the receiver stores the received security policy updating data to the corresponding key managing unit 100 (the second key managing unit).

The multiplexing/de-multiplexing unit 400 is configured to multiplex/de-multiplex the RTP multicast session data protected by SRTP, the security policy request and response protected by the DTLS protocol, and the security policy updating data protected by the KEK.

In particular, a data transmission channel is set up between the multiplexing/de-multiplexing unit 400 (a second multiplexing/de-multiplexing unit) in the receiver and the multiplexing/de-multiplexing unit 400 (a first multiplexing/de-multiplexing unit) in the sender. The data transmission channel is used to transmit the multiplexed RTP multicast session data, security policy request and response, and security policy updating data.

In this embodiment, all the data to be exchanged during key negotiation needs to be multiplexed and de-multiplexed by the multiplexing/de-multiplexing unit 400. In addition, to be compatible with the prior art, this embodiment may adopt the secondary multiplexing mechanism to differentiate RTP data, key data, and other relevant protocol data.

During de-multiplexing, for example, a Version field of SRTP is used for de-multiplexing. In the received multiplexed data, the data with the Version field set to 0 is other relevant protocol data and is sent to relevant modules for processing; the data with the Version field set to 1 is key data and requires secondary multiplexing; and the data with the Version field set to 2 is RTP data and is directly sent to the transmitting unit 500 for processing. Secondary de-multiplexing needs to be performed on the data with the Version field set to 1 and the corresponding flag bit is used to differentiate the security policy request, security policy response, and security policy updating data. The security policy request and security policy response are directly sent to the key pulling unit 200 for processing; and the security policy updating data is sent to the key pushing unit 300 for processing. The data multiplexing process is reverse to the foregoing de-multiplexing process and is not further described.

The transmitting unit 500 is configured to: transmit RTP session data through standard SRTP, decrypt the received SRTP data according to the security policy obtained from the key managing unit 100, and cache the new CK in the push process of updating the security policy.

In particular, the transmitting unit 500 (a second transmitting unit) in the receiver is configured to: obtain the security policy from the key managing unit 100 (the second key managing unit), decrypt the received SRTP data, and cache the new CK in the push process of updating the security policy. The transmitting unit 500 (a first transmitting unit) in the sender is configured to set up an RTP session channel with the transmitting unit 500 (the second transmitting unit) in the receiver to send the RTP multicast session data.

Figure 6:
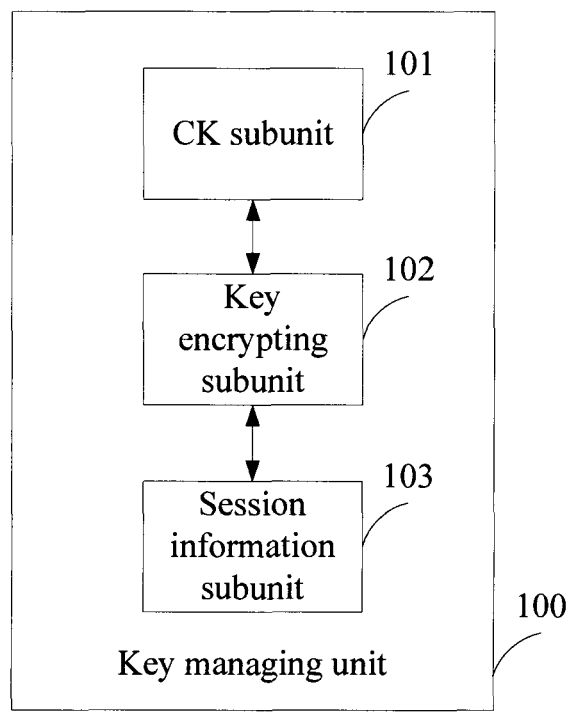
FIG. 6 shows a structure of a key managing unit in an apparatus for sending/receiving the security policy of multicast sessions according to an embodiment of the present disclosure.

Preferably, as shown in FIG. 6, the key managing unit 100 in the foregoing embodiment further includes a CK subunit 101, a key encrypting/decrypting subunit 102, and a session information subunit 103.

The CK subunit 101 is configured to store the CK in the security policy of SRTP. In the receiver, the CK subunit 101 is further configured to load the CK in the security policy to the transmitting unit 500.

The key encrypting/decrypting subunit 102 is configured to store the KEK and the relevant parameters required to generate the KEK in the process of updating the security policy. These parameters are used to perform KEK encryption/decryption on the generated CK data when the key pushing unit 300 pushes the key.

The session information subunit 103 is configured to store RTP session information. In the receiver, the session information subunit 103 is further configured to load the CK to the transmitting unit 500.

Figure 7:
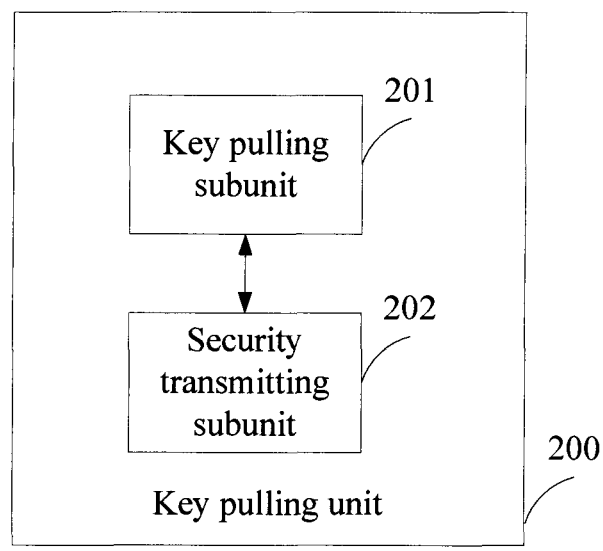
FIG. 7 shows a structure of a key pulling unit in an apparatus for sending/receiving the security policy of multicast sessions according to an embodiment of the present disclosure.

As shown in FIG. 7, the key pulling unit 200 in the foregoing embodiment may further include a key pulling subunit 201 and a security transmitting subunit 202.

The key pulling subunit 201 is configured to implement the pull process of the security policy. In the receiver, the key pulling subunit 201 is configured to initiate a security policy request and receive a security policy response. In the sender, the key pulling subunit 201 is configured to receive a security policy request, obtain the security policy from the key managing unit 100, and construct and send a security policy response.

The security transmitting subunit 202 is configured to run the standard DTLS protocol to set up a DTLS session between the receiver and the sender, and use the DTLS record layer to protect the privacy and integrity of the security policy request and security policy response sent from the key pulling subunit 200.

Figure 8:
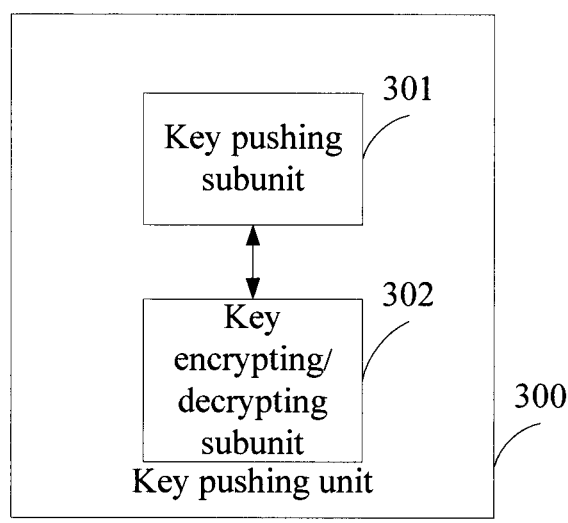
FIG. 8 shows a structure of a key pushing unit in an apparatus for sending/receiving the security policy of multicast sessions according to an embodiment of the present disclosure.

Preferably, as shown in FIG. 8, the key pushing unit 300 in the foregoing embodiment further includes a key pushing subunit 301 and a key encrypting/decrypting subunit 302.

In the sender, the key pushing subunit 301 is configured to update and send security policy updating data. In the receiver, the key pushing subunit 301 is configured to: receive the security policy updating data and send the received security policy updating data to the key managing unit 100 to update the security policy. The security policy updating data includes the updated CK, RTP session, and optional KEK. The optional KEK is used to update the KEK of the receiver. The CK, RTP session information, and optional KEK required to update the security policy are provided by the key managing unit 100.

The key encrypting/decrypting subunit 302 is configured to obtain a KEK from the key managing unit 100 to encrypt/decrypt the group policy updating data. Specific key parameters such as the encryption algorithm, encryption key, integrity protection algorithm, and integrity protection key are provided by the key managing unit 100.

The embodiments of the present disclosure provide an in-band negotiation function for the security policy. This function can avoid many issues caused by out-of-band security policy negotiation, such as the support from the architecture, out of synchronization between contents and keys, indefinite trusted terminals, and unsupported firewall traversal. In addition, the embodiments of the present disclosure multiplex DTLS codes and extend the point-to-point DTLS+SRTP multi1cast solution, which reduces the difficulty in system implementation and the apparatus provided in the embodiments may be easily integrated into handheld mobile devices with limited resources.

The embodiments of the present disclosure are widely used in various scenarios, for example, in a content delivery network (CDN) and a large multimedia multicast conference (MMC).

As a network architecture based on the content delivery technology, the CDN uses the cache server on the network edge node to allocate and access resources according to the principle of proximity through the load balancing algorithm. The CDN can effectively speed up the response of multimedia information and shorten the access delay of users.

If the CDN adopts multicast RTP as the multimedia transport protocol, the core server in the CDN serves as the multicast source and the edge node serves as the multicast receiving point. SRTP is used to protect the security of RTP session data during transmission. The embodiments of the present disclosure provide the security policy for RTP session data, protect content privacy and integrity for the CDN, and prevent the multimedia information from being browsed or played during the delivery.

In an MMC, a maximum number of 1,000,000 users can be supported. Thus, the multicast mode provided in the embodiments of the present disclosure may be used as the bearer protocol of RTP and users can join corresponding multicast conferences by joining specified multicast groups. The method and multicast apparatus provided in the embodiments of the present disclosure provide privacy and integrity protection for multicast information during transmission and prevent various security issues in delivering conference content.

A multicast sending apparatus in an embodiment of the present disclosure includes: a first key pulling unit, configured to set up a DTLS session and construct a security policy response according to the security policy; a first transmitting unit, configured to construct SRTP multicast session data; and a first multiplexing/de-multiplexing unit, configured to receive the security policy request, multiplex the security policy response and the SRTP multicast session data, and send the multiplexed data.

The step for the first multiplexing/de-multiplexing unit to receive a security policy request includes: receiving and de-multiplexing the multiplexed security policy request and SRTP multicast session data.

The multicast sending apparatus further includes a first key managing unit. The first key managing unit is configured to store security policies.

The first key pulling unit is further configured to obtain the security policy from the first key managing unit to construct a security policy response.

The multicast sending apparatus further includes: a first key pushing unit, configured to obtain a security policy from the first key managing unit when the security policy expires or is no longer secure and construct security policy updating data according to the obtained security policy; and the first multiplexing/de-multiplexing unit, configured to multiplex the SRTP multicast session data and the security policy updating data and send the multiplexed data.

The first key pushing unit further includes: a first key pushing subunit; configured to obtain a security policy from the first key managing unit and generate security policy updating data according to the security policy; and a first key encrypting/decrypting subunit, configured to obtain a KEK in the security policy from the first key managing unit and use the KEK to encrypt the security policy updating data.

The first key pulling unit further includes: a first key pulling subunit, configured to receive a security policy request, and construct and send a security policy response; and a first security transmitting subunit, configured to use the DTLS protocol to protect the privacy and integrity of the security policy response sent from the first key pulling subunit.

A multicast receiving apparatus in an embodiment of the present disclosure includes: a second key pulling unit, configured to set up a DTLS session and generate a security policy request; a second transmitting unit, configured to process SRTP multicast session data; and a second multiplexing/de-multiplexing unit, configured to multiplex the security policy request and the SRTP multicast session data and send the multiplexed data.

The second multiplexing/de-multiplexing unit is further configured to receive and de-multiplex the multiplexed security policy response and SRTP multicast session data.

The multicast receiving apparatus further includes a second key managing unit. The second key managing unit is configured to store the security policy carried in the security policy response.

The second multiplexing/de-multiplexing unit is further configured to receive and de-multiplex the multiplexed SRTP multicast session data and security policy updating data.

The second key managing unit is further configured to store the security policy carried in the security policy updating data.

The second key pulling unit further includes: a second key pulling subunit, configured to initiate a security policy request; and a second security transmitting subunit, configured to use the DTLS protocol to protect the privacy and integrity of the security policy request sent from the second key pulling subunit.

A communication system for the security policy of multicast sessions in an embodiment of the present disclosure includes: a multicast sending apparatus, configured to: receive a security policy request after a DTLS session is set up, construct a security policy response according to the security policy, multiplex the security policy response and the SRTP multicast session data, and send the multiplexed data; and a multicast receiving apparatus, configured to: generate a security policy request after a DTLS session is set up, multiplex the security policy request and the SRTP multicast session data, and send the multiplexed data.

The step for the multicast sending apparatus to receive a security policy request includes: receiving and de-multiplexing the multiplexed security policy request and SRTP multicast session data.

The multicast receiving apparatus is further configured to receive and de-multiplex the multiplexed security policy response and SRTP multicast session data.

It is apparent that those skilled in the art may make various modifications and variations to the present disclosure without departing from the scope of the present disclosure. The present disclosure is intended to cover such modifications and variations provided that they fall in the scope of protection defined by the following claims or their equivalents.

What is claimed is:

1. A method for sending a security policy of multicast sessions, comprising:
   setting up a Datagram Transport Layer Security (DTLS) session between a sender and a receiver after the receiver joining a multicast group to start a SRTP multicast session with the sender;
   receiving by the sender, a security policy request sent under the DTLS session from the receiver;
   in response to the received security policy request under the DTLS session, constructing by the sender, a security policy response according to a security policy;
   multiplexing data by the sender, wherein the multiplexed data comprises the security policy response and Secure Real-Time Transport Protocol (SRTP) multicast session data; and
   sending by the sender, the multiplexed data to the receiver under the SRTP multicast session;
   wherein a first key pushing unit comprises:
   a first key pushing subunit configured to obtain the security policy from a first key managing unit and generate security policy updating data according to the obtained security policy; and
   a first key encrypting or decrypting subunit configured to obtain a key encryption key (KEK) in the security policy from the first key managing unit and use the KEK to encrypt the security policy updating data.

2. The method of claim 1, wherein the step of receiving the security policy request comprises:
   receiving multiplexed security policy request and the SRTP multicast session data; and
   de-multiplexing the multiplexed security policy request and the SRTP multicast session data.

3. The method of claim 1, wherein the security policy response is protected by a DTLS protocol.

4. The method of claim 1, further comprising:
   constructing the security policy updating data when detecting that the received security policy expires or is no longer secure; and
   using a multicast channel to send the security policy updating data.

5. The method of claim 4, wherein the step of using the multicast channel to send the security policy updating data comprises:
   multiplexing the security policy updating data and SRTP multicast session data; and
   sending the multiplexed security policy updating data and SRTP multicast session data.

6. The method of claim 4, before using the multicast channel to send the security policy updating data, further comprising:
   using a key encryption key (KEK) in the security policy to encrypt the security policy updating data.

7. A multicast sending apparatus including a server with a processor and a memory, comprising:
   a first key pulling unit configured to:
   set up a Datagram Transport Layer Security (DTLS) session after a multicast receiving apparatus joining a multicast group to start a SRTP multicast session with the multicast sending apparatus,
   receive from the multicast receiving apparatus, a security policy request sent under the DTLS session, and construct a security policy response according to a security policy;
   a first transmitting unit configured to construct Secure Real-Time Transport Protocol (SRTP) multicast session data; and
   a first multiplexing or de-multiplexing unit configured to:
   multiplex data, wherein the multiplexed data comprises the security policy response and the SRTP multicast session data, and
   send the multiplexed data to the multicast receiving apparatus;
   wherein a first key pushing unit comprises:
   a first key pushing subunit configured to obtain the security policy from a first key managing unit and generate security policy updating data according to the obtained security policy; and
   a first key encrypting or decrypting subunit configured to obtain a key encryption key (KEK) in the security policy from the first key managing unit and use the KEK to encrypt the security policy updating data.

8. The multicast sending apparatus of claim 7, wherein the first multiplexing or de-multiplexing unit is further configured to de-multiplex the security policy request and the SRTP multicast session data when the security policy request and the SRTP multicast session data are multiplexed.

9. The multicast sending apparatus of claim 7,
   wherein:
   the first key managing unit is configured to store security policies; and
   the first key pulling unit is further configured to obtain the security policy from the first key managing unit to construct the security policy response.

10. The multicast sending apparatus of claim 7, further comprising:
the first key pushing unit configured to obtain the security policy from the first key managing unit when the security policy expires or is no longer secure and construct the security policy updating data according to the obtained security policy; and
the first multiplexing or de-multiplexing unit configured to multiplex the SRTP multicast session data and the security policy updating data.

11. The multicast sending apparatus of claim 7, wherein the first key pulling unit further comprises:
a first key pulling subunit configured to receive the security policy request and
construct and send the security policy response; and
a first security transmitting subunit configured to use a DTLS protocol to protect privacy and integrity of the security policy response sent from the first key pulling subunit.

12. A multicast receiving apparatus including a server with a processor and a memory, comprising:
a key pulling unit configured to:
set up a Datagram Transport Layer Security (DTLS) session after joining a multicast group to start a SRTP multicast session with a multicast sending apparatus, and
generate a security policy request;
a transmitting unit configured to:
send the security policy request to the multicast sending apparatus under the DTLS session, and
generate Secure Real-Time Transport Protocol (SRTP) multicast session data; and
a multiplexing or de-multiplexing unit configured to:
multiplex data, wherein the multiplexed data comprises the security policy request and the SRTP multicast session data, and
send the multiplexed data to the multicast sending apparatus under the DTLS session;
wherein a first key pushing unit comprises:
a first key pushing subunit configured to obtain the security policy from a first key managing unit and generate security policy updating data according to the obtained security policy; and
a first key encrypting or decrypting subunit configured to obtain a key encryption key (KEK) in the security policy from the first key managing unit and use the KEK to encrypt the security policy updating data.

13. The multicast receiving apparatus of claim 12, wherein:
the multiplexing/de-multiplexing unit is further configured to receive and
de-multiplex multiplexed security policy response and SRTP multicast session data; and
the multicast receiving apparatus further comprises:
a key managing unit configured to store the security policy carried in the security policy response.

14. The multicast receiving apparatus of claim 13, wherein:
the multiplexing/de-multiplexing unit is further configured to receive and de-multiplex the multiplexed SRTP multicast session data and security policy updating data; and
the key managing unit is further configured to store the security policy carried in the security policy updating data.

15. The multicast receiving apparatus of claim 12, wherein the key pulling unit further comprises:
a key pulling subunit configured to initiate the security policy request; and
a security transmitting subunit configured to use a DTLS protocol to protect privacy and integrity of the security policy request sent from the key pulling subunit.

16. A network system including a server with a processor and a memory, comprising a multicast receiving apparatus and a multicast sending apparatus, wherein:
the multicast receiving apparatus is configured to:
set up a Datagram Transport Layer Security (DTLS) session with the multicast sending apparatus after joining a multicast group to start a SRTP multicast session with the multicast sending apparatus,
generate a security policy request,
multiplex first data, wherein the first multiplexed data comprises the security policy request and the Secure Real-Time Transport Protocol (SRTP) multicast session data, and
send the first multiplexed data to the multicast sending apparatus; and
the multicast sending apparatus is configured to:
set up the DTLS session with the multicast receiving apparatus, receive the security policy request sent from the multicast receiving apparatus under the DTLS session,
construct a security policy response according to a security policy, multiplex second data, wherein the second multiplexed data comprises the security policy response and the SRTP multicast session data, and
send the second multiplexed data to the multicast receiving apparatus;
wherein a first key pushing unit comprises:
a first key pushing subunit configured to obtain the security policy from a first key managing unit and generate security policy updating data according to the obtained security policy; and
a first key encrypting or decrypting subunit configured to obtain a key encryption key (KEK) in the security policy from the first key managing unit and use the KEK to encrypt the security policy updating data.

17. The network system of claim 16, wherein:
the step for the multicast sending apparatus to receive the security policy request comprises:
receiving and de-multiplexing the multiplexed security policy request and the SRTP multicast session data.

18. The network system of claim 16, wherein:
the multicast receiving apparatus is further configured to receive and de-multiplex the multiplexed security policy response and the SRTP multicast session data.

* * * * *